United States Patent [19]

Erb et al.

[11] 4,295,378

[45] Oct. 20, 1981

[54] METHOD AND APPARATUS FOR FLOW MEASUREMENT USING DOPPLER FREQUENCY SHIFT

[75] Inventors: Tom L. Erb; Wendell D. Miller, both of Austin, Tex.

[73] Assignee: Ramsey Engineering Company, St. Paul, Minn.

[21] Appl. No.: 120,189

[22] Filed: Feb. 11, 1980

[51] Int. Cl.³ ............................................. G01F 1/66
[52] U.S. Cl. .................................................. 73/861.25
[58] Field of Search ........................................ 73/862.25

[56] References Cited

U.S. PATENT DOCUMENTS 4,078,428  3/1978  Baker et al. ............... 73/861.31
4,147,059  4/1979  Fathauer ..................... 73/861.25

*Primary Examiner*—Charles A. Ruehl
*Attorney, Agent, or Firm*—William C. Norvell, Jr.

[57] ABSTRACT

A method of placement of transducers on a pipe in positions where their beam axes intersect a point on the locus of points where the incremental flow is equal to the average flow is shown and described.

12 Claims, 5 Drawing Figures

U.S. Patent
Oct. 20, 1981
4,295,378
FIG 1
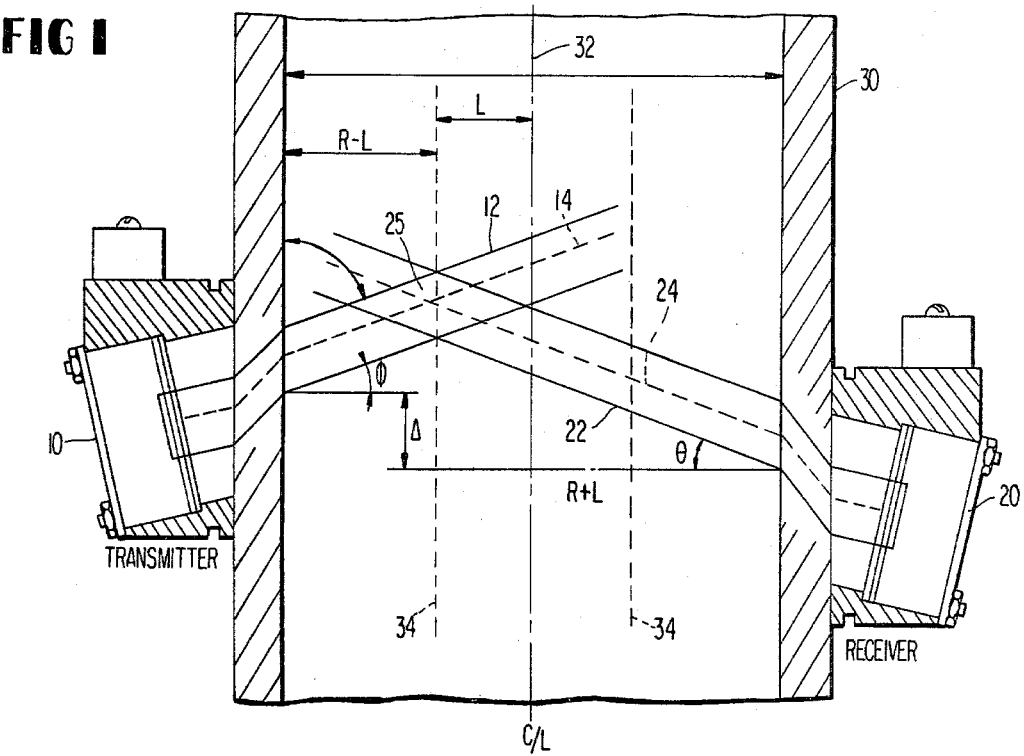
FIG 2 PRIOR ART
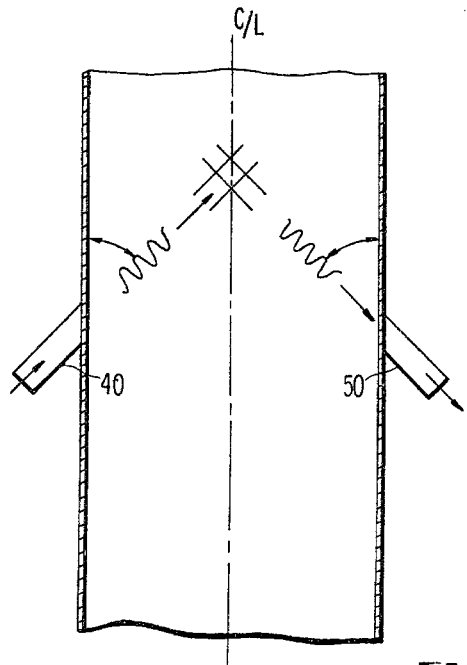
FIG 3
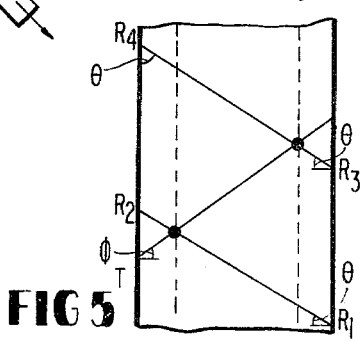
FIG 4
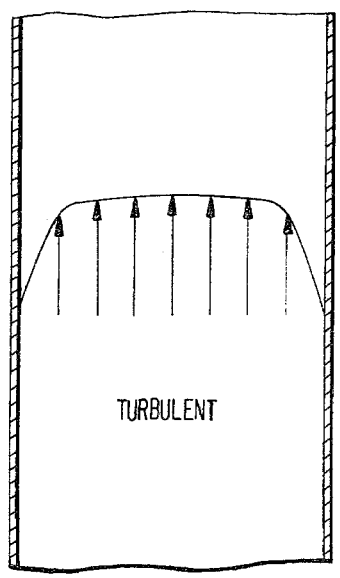
FIG 5

METHOD AND APPARATUS FOR FLOW MEASUREMENT USING DOPPLER FREQUENCY SHIFT

BACKGROUND OF THE INVENTION

1. Field of the Invention

This invention relates to the measurement of the flow of media in pipes by the use of the Doppler frequency shift technique. In these measurements, sound waves are transmitted into the media through the wall of a pipe and are received through the wall of the pipe by means of transducers, respectively, attached to the pipe wall at preselected positions.

2. Description of the Prior Art

In FIG. 2, there is illustrated the conventional method of Doppler sonic flow measurement for measuring the flow of media in a pipe. Transducers are placed on opposite sides of the pipe and they are directed toward the media at the center of the pipe. The transmitting and receiving transducers also have the same angle of entry into the pipe, and there is no lateral offset between them. An example of such a system and method is found in U.S. Pat. No. 4,122,713 which shows in FIGS. 1 and FIG. 2 transducers disposed on opposite sides of a media conduit and the measurement of the flow rate effectively at the center of the conduit.

U.S. Pat. No. 4,062,237 shows another example of a conventional Doppler sonic flow measurement system utilizing a fixed relationship between the transmitter and receiver transducers. In this system, the measurement of flow rate in a conduit is derived using a single source and not using transducers disposed on opposite sides of the conduit. In this system, the flowmeter is capable of measuring the three-dimensional velocity vector of dynamic particles, particularly blood cells flowing in a vein. Complex electronics is then used to analyze the information received from the Doppler sonic flow measurement in order to derive the information required with respect to the flow being measured.

The use of compensating electronics for the purpose of computing average flow rates is common and often necessary in conventional systems. In other conventional systems where accuracy is not critical, the complex electronic compensation techniques have been simplified or eliminated.

In U.S. Pat. No. 4,067,236, there is shown another Doppler sonic flow measurement system which utilizes a crystal array of transducers to obtain an average flow by looking at all parts of the flow profile. In this system, there are a multiplicity of measurements, and the system does not depend upon any prior knowledge of the flow, or prediction of flow measurement points.

OBJECTS OF THE INVENTION

It is an object of this invention to eliminate the necessity for complex electrical compensation required in systems which utilize the Doppler sonic flow measurement technique for accurate measurements of average flow rates of a media in a conduit or pipe.

It is a further object of this invention to provide a method for accurate predetermination of the locus of points within a pipe where the incremental flow rate is equal to the average flow rate of the pipe.

It is yet another object of this invention to provide a method of placement of transducers on a pipe whereby the intersection of the central beam axes of the transducers is at a point where the incremental flow is equal to the average flow rate.

BRIEF SUMMARY OF THE INVENTION

This invention relates to a new and improved method and apparatus for Doppler sonic flow measurement. In this invention, the locus of points within a media conduit is determined where the incremental flow is substantially equal to the average flow rate of the conduit. Once this locus of points is determined, the Doppler sonic flow measurement transducers of the present invention are focused on at least one point located on said locus.

By measuring the media flow at a point where the incremental flow is substantially equal to the average flow of the pipe, the method and apparatus of the present invention eliminates the need for complex electronic compensating means and provides simple but accurate flow rate measurements.

In determining the locus of points in accordance with the method and apparatus of the present invention, it is necessary to know whether the flow in the pipe is laminar or turbulent, and if it is turbulent, what the Reynolds number is for the turbulent flow in the pipe. Once these basic determinations have been made, it is then possible to compute the cylindrical locus of points in the pipe interior where the incremental flow rate is substantially equal to the average flow rate. By more complex mathematical techniques, analyses in accordance with the present invention may be performed on more complex shapes to determine the locus of points or at least a portion of the locus where the incremental flow is substantially equal to the average flow rate of the pipe or conduit.

Further by this invention, transducers are placed at precise locations along the pipe in order to assure that each transducer beam central axis intersects a predetermined point within the pipe or conduit.

DESCRIPTION OF THE DRAWINGS

FIG. 1 illustrates a pipe having two transducers placed upon opposite sides in accordance with this invention.

FIG. 2 shows the typical transducer placement on a pipe in conventional Doppler sonic flowmeter systems.

FIG. 3 plots a flow velocity profile within a pipe where the media flow in the pipe is known to be laminar.

FIG. 4 plots a flow velocity profile within a pipe where the media flow is known to be turbulent.

FIG. 5 illustrates the geometric representation of a circular pipe where the locus of points comprises a coaxial cylinder, and also illustrates other possible alternative placement of transducers in accordance with this invention.

DETAILED DESCRIPTION OF THE INVENTION

In FIG. 1, there is shown a pipe 30 having affixed to it a transmitter transducer 10 and a receiver transducer 20. The transmitter transducer 10 projects a beam 12 having a beam axis 14 substantially located in its center. Similarly, receiver transducer 20 has a beam 22 which also includes a beam axis 24 substantially along its center.

In the embodiment of the present invention of FIG. 1, transmitter 10 and receiver 20 are placed on opposite sides of the pipe, 180° apart. The transmitter 10 is longitudinally offset from receiver 20 by a distance in FIG. 1 designated as Δ. This longitudinal offset between transducers 10, 20 provides for intersection of the central beam axes 14 and 24 at a point 25 which is offset from the center line 32 of the pipe 30. In contrast, there is no longitudinal offset of the transducers in FIG. 2 because the prior art systems contemplate measurement only at the center of the pipe.

The intersection of the transmitter and receiver beams at point 25 is at a distance L from center line 32. In the case of a cylindrical pipe, this L distance is the distance from the center line 32 of the pipe 36 to the locus of points wherein the incremental flow velocity is substantially equal to the average flow of the media flowing in the conduit or pipe. The locus is a coaxial cylinder within the pipe or conduit.

In the case of laminar flow, as illustrated in FIG. 3, the determination of the distance from the center line to the locus of points wherein the incremental flow is substantially equal to the average flow is determined as follows: It is known that $$V_a = (V_c/2)$$

where $V_a$ is the average flow in the pipe and $V_c$ is the maximum flow rate in the center of the pipe. Further, it is known that at any point other than the center of the pipe, the velocity $V_L$ can be found as folllows:

$$V_L = V_c[1 - (L^2/R^2)]$$

where $V_L$ is the flow at any point, $V_c$ is the flow at the center, L is the distance from the point to the center, and R is the radius of the pipe. By making $V_a$ equal to $V_L$ and solving in accordance with the above equations, it can be seen that in the case of laminar flow the quantity L is given by the following equations:

$$L = (R\sqrt{2})$$

Once the radius of the pipe is known, and it is known that the flow is laminar, it is straight forward to determine the distance L as shown above.

In the case of turbulent flow, it is known that $$V_L = V_c[1 - (L/R)]^k$$

where k is equal to approximately 1/7 for typical Reynolds numbers, $V_c$ is the flow at the center, L is the distance from the point to the center and R is the radius.

Further, in the case of turbulent flow, it has been found that $$V_a = 0.817 V_c.$$

Therefore, when $V_a$ is equated to $V_L$, the solution for L is:

$$L = 0.76R.$$

In the case of a circular pipe 30, when the distance L is established, the coaxial cylindrical locus of points wherein the incremental flow rate is equal to the average flow rate is known.

When the coaxial cylindrical locus of points is known, it is then possible to place the transducers 10 and 20 on the pipe in positions so that the intersection of their beam center axes will be on the locus of points at a distance L from the center line 32 of the pipe 30. In the case a depicted in FIG. 1, with the transducers located on opposite sides of the pipe and 180° apart, the longitudinal offset is determined in accordance with the following formula:

$$\Delta = (R+L) \tan \theta - (R-L) \tan \phi$$

wherein Δ is the longitudinal offset between the two transducers 10 and 20, R is the radius of the pipe, and L is the distance from the center line of the pipe to the locus of points wherein the incremental flow is equal to the average flow rate. The angle θ as shown in FIG. 1 is the angle between the beam 22 from transducer receiver 20 and a line perpendicular to the wall of pipe 30. Similarly, the angle φ is the angle between the beam 12 and a line perpendicular to the pipe 30.

It is apparent that once the locus of points wherein the incremental flow is equal to the average flow is established, there may be many points on this locus where a transmitter beam and a receiver beam may intersect. In FIG. 5, there is shown a single transmission beam. Here, there may be as many as 4 different receiver locations at points which are either opposite the pipe from the transmitter or on the same side of the pipe as the transmitter. In FIG. 5, there are two possible receiver locations R1 and R3 on the opposite side of the pipe. In accordance with the above equation for the longitudinal offset, of receiver R1 on the opposite side of the pipe is in accordance with the formula:

$$\Delta = (R+L) \tan \theta - (R-L) \tan \phi.$$

In the instance of receiver R2 located on the same side of the pipe, Δ is determined in accordance with the following formula:

$$\Delta = (R-L) \tan \phi + (R-L) \tan \theta$$

In the case of cylindrical pipes, transducers may be placed at points other than 0° or 180° as shown in the preferred embodiment. Different calculations will be required to determine the transducer placement which will insure that the intersecting point is on the locus where the incremental flow is equal to the average.

Again referring to FIG. 5, the computation of the offset between transducers can also be represented by the following formula:

$$\Delta = \tan \phi [D_\phi] \pm \tan \theta [D_\theta]$$

where φ is the angle between the transmitter beam and a line perpendicular to the pipe wall, $D_\phi$ is the distance from the transmitter transducer to the measurement point, φ is the angle between a receiver beam and a line perpendicular to the pipe wall, and $D_\theta$ is the distance from the receiver transducer to the point of measurement.

By this relationship, it can be seen that the longitudinal offset is only dependent upon the distance from the transducer to the point of intersection on the locus. In FIG. 5, the transmitter transducer T will project a beam across the pipe and intersect the locus at two different points. For the receiver transducers R1 or R3 which are on the opposite sides of the pipe, the sign of tan φ[$D_\theta$[ will be negative because the distances are substractive. Similarly, for receivers R2 and R4 placed upon the same side of the pipe, the distances will be additive, and the sign tan φ[$D_\theta$] will be positive.

In the preferred embodiment discussed above, there is disclosed and described the method for determining the locus of points in a circular pipe or conduit where the incremental flow rate is equal to the average flow rate of the media. It is however possible to determine in the case of non-circular pipes, the locus of at least one point or several points wherein it is known that the incremental flow is equal to the average flow. Therefore, if any such point is known within a conduit configuration, it is possible to practice the method of measurement which requires that the location of the average flow point be known.

What is claimed is:

1. The method of measurement of the average velocity of media flowing in a conduit by the use of Doppler frequency shift comprising the steps of:
   (a) determining the locus of points within said conduit where the incremental media flow rate is equal to the average flow rate of the media in said conduit;
   (b) directing a transmitting transducer beam central axis to an intersecting point on said locus of points;
   (c) directing a receiving transducer beam central axis at said intersecting point on said locus of points;
   (d) measuring the incremental rate of flow at said intersecting point on said locus by the use of Doppler frequency shift flow measurement.

2. The method of claim 1 further including a first step of determining whether the flow of said media is laminar or turbulent.

3. The method of claim 1 wherein said conduit is a pipe having a circular cross-section, and said locus is a coaxial cylinder within said pipe.

4. The method of claim 3 wherein said transmitting transducer and said receiving transducer are placed on opposite sides of said pipe.

5. The method of claim 4 wherein said transducers are sapced 180° around said pipe.

6. The method of claim 3 wherein said transmitting transducer and receiving transducer are longitudinally offset from each other.

7. The method of claim 6 wherein said longitudinal offset is determined in accordance with the following relationship:

$$\Delta = \tan \phi [D_\phi] \pm \tan \theta [D_\theta]$$

where $\Delta$ is the longitudinal offset;

where $\phi$ and $\theta$ are the angles between transmitting and receiving transducers and a line perpendicular to said pipe wall;

where $D_\phi$ is the distance from the transducer having an angle $\phi$ to the intersection on the locus of points;

where $D_\theta$ is the distance from the transducer having an angle $\theta$ to the intersection on the locus of points; and where the sign is positive if the transducers are on the same side of the pipe and negative when they are on opposite sides of said pipe.

8. The method of claim 6 wherein said longitudinal offset is determined in accordance with the following relationship:

$$\Delta = \tan \phi(R-L) + \tan \theta(R-L)$$

where $\Delta$ is the longitudinal offset, where R is the radius of said pipe, where L is the distance from the center of said pipe to said coaxial cylinder locus of points;

when $\theta$ is the angle of entry of one of said transmitting or receiving central axes;

where $\phi$ is the angle of entry of the other of said transmitting or receiving transducer central axes, and where the transducers are on the same side of said pipe.

9. The method of claim 6 wherein said longitudinal offset is determined in accordance with the following relationship:

$$\Delta = (R+L) \tan \theta - (R-L) \tan \phi$$

where $\Delta$ is the longitudinal offset, where R is the radius of said pipe, where L is the distance from the center of said pipe to said coaxial cylinder locus points, where $\theta$ is the angle of entry of one of said transmitting or receiving transducer central axes, where $\phi$ is the angle of entry of the other of said transmitting or receiving transducer central axes; and where the transducers are on opposite sides of said pipe.

10. The method of claim 7 wherein L is determined in accordance with the following relationship when the flow is known to be laminar:

$$L = R/\sqrt{2}$$

11. The method of claim 7 wherein L=0.76R when the flow is known to be turbulent.

12. The method of claim 1 wherein each of said transducer central beams enter the pipe at an angle to the flow direction.

* * * * *